United States Patent
Ohgaki et al.

[11] Patent Number: 5,903,228
[45] Date of Patent: May 11, 1999

[54] MAP INFORMATION DISPLAY APPARATUS AND TRAVELING ROUTE DISPLAY APPARATUS AND ROUTE GUIDANCE APPARATUS FOR MOVING BODY

[75] Inventors: Tadao Ohgaki; Tamiya Tanaka; Hirotaka Yamamoto; Chieko Matsui, all of Kanagawa, Japan

[73] Assignee: Sony Corporation, Tokyo, Japan

[21] Appl. No.: 08/890,179

[22] Filed: Jul. 9, 1997

Related U.S. Application Data

[63] Continuation of application No. 08/537,859, Mar. 1, 1996, abandoned.

[30] Foreign Application Priority Data

May 27, 1994 [JP] Japan ................................ 6-115301

[51] Int. Cl.$^6$ ................................................. G08G 1/123
[52] U.S. Cl. .................... 340/995; 340/988; 340/990; 701/202; 701/209; 701/211; 389/32; 389/33; 389/47
[58] Field of Search ................................. 340/995, 988, 340/990; 701/200, 202, 207, 209, 211, 213; 704/200, 201; 369/32, 48, 50, 52, 47

[56] References Cited

U.S. PATENT DOCUMENTS

| | | | |
|---|---|---|---|
| 5,173,691 | 12/1992 | Sumner | 340/905 |
| 5,177,685 | 1/1993 | Davis et al. | 364/443 |
| 5,181,250 | 1/1993 | Morgan et al. | 381/51 |
| 5,272,638 | 12/1993 | Martin et al. | 364/444 |
| 5,274,560 | 12/1993 | LaRue | 701/202 |
| 5,442,557 | 8/1995 | Kaneko | 364/449 |
| 5,452,217 | 9/1995 | Kishi et al. | 701/207 |
| 5,463,554 | 10/1995 | Araki et al. | 364/444 |
| 5,470,233 | 11/1995 | Fruchterman et al. | 434/112 |
| 5,502,640 | 3/1996 | Yagyu et al. | 701/200 |
| 5,544,061 | 8/1996 | Morimoto et al. | 701/202 |
| 5,559,511 | 9/1996 | Ito et al. | 340/995 |
| 5,614,898 | 3/1997 | Kamiya et al. | 340/995 |
| 5,617,319 | 4/1997 | Arakawa et al. | 701/207 |

FOREIGN PATENT DOCUMENTS

0560987A1  5/1992  European Pat. Off. .

OTHER PUBLICATIONS

"Speech Synthesis Today and Tomorrow", *Phillips Journal of Research*, vol. 47, No. 1, pp. 15–34, Jan. 1, 1992 (Collier et al.).

*Primary Examiner*—Benjamin C. Lee
*Attorney, Agent, or Firm*—Jay H. Maioli

[57] ABSTRACT

A traveling route display apparatus for a moving body such as an automotive vehicle includes a position detecting section, an output section, a display section, and a converting section. The position detecting section detects a current position of the moving body by using a signal transmitted from a satellite. The output section outputs map information including character information corresponding to a position on the map recorded on a recording medium, etc. The display section displays the map information delivered from the output section, and displays, on the map information, the current position of the moving body detected by the position detecting section. In addition, the converting section converts character information corresponding to the current position of the moving body detected by the position detecting section into voice to output it.

9 Claims, 4 Drawing Sheets

A

B

EXPLANATORY VIEW OF
MAP DATA BASE STRUCTURE

BLOCK CIRCUIT DIAGRAM OF
MAP DISPLAY APPARATUS

EXPLANATORY VIEW OF OPERATION
OF MAP DISPLAY APPARATUS

EXPLANATORY VIEW OF
MAP DATA BASE STRUCTURE

MAP INFORMATION DISPLAY APPARATUS AND TRAVELING ROUTE DISPLAY APPARATUS AND ROUTE GUIDANCE APPARATUS FOR MOVING BODY

This is a continuation of application Ser. No. 08/537,859 filed Mar. 1, 1996 now abandoned.

TECHNICAL FIELD

This invention relates to a map information display apparatus, a traveling route (path) display apparatus for a moving body, and a route (path) guidance apparatus for a moving body.

Particularly, this invention relates to a map information display apparatus, a traveling route display apparatus for a moving body, and a route (path) guidance apparatus for a moving body using a recording medium having character information corresponding to positions on the map.

BACKGROUND ART

There are map information display apparatuses using, e.g., a so called CD-ROM disc, i.e., a read only memory using a Compact Disc (DC) as a recording medium on which map information is recorded. In accordance with such map information display apparatuses, a current position of the user is measured by a position measuring (determining) apparatus, such as, for example the, so called Global Positioning System (GPS) to display map information in the vicinity of the current position and the current position on the map on a display unit such as Liquid Crystal Display (LCD) or Cathode Ray Tube (CRT), etc., or to display map information in the vicinity of an arbitrary place or places and an arbitrary position or positions on the map designated by the user.

In such map information display apparatuses, the user reproduces a recording medium on which map information is recorded, e.g., CD-ROM disc, etc. to select map information within a certain range to allow the display section of the display unit to display that map. User looks at the picture on screen of the display unit, thereby making it possible to recognize arbitrary positions and place names indicated by the respective positions, etc.

Moreover, the user sets the route (path) guidance mode at the map information display apparatus to set in advance the movement route (path) of the user, thereby making it possible to register respective points of places of that route, etc. At this time, the mark, etc. designating a route (path) set by the route guidance mode is displayed on the display unit of the map information display apparatus. Thus, the user looks at the map displayed on the screen of the display unit, thereby making it possible to confirm positions and names of respective points of places of that route.

Setting of the route at the time of the route guidance mode is carried out by operating a cursor key, etc. of the input unit provided at the map information display apparatus to move the cursor on the map of the display picture to thereby designate a specific place, e.g., place of departure, point of place of route or place of destination, etc., or an arbitrary place, e.g., a certain point of place, cross-point or road, etc.

Meanwhile, since confirmation of the current position and place of destination on the display unit of the map information display apparatus is carried out by allowing the driver to directly confirm, by visual observation, information displayed on the display unit, any problem that might take place in the safe operation an automotive vehicle dangerous.

Moreover, in the map information display apparatus in which the route guidance mode is provided, the route automatically selected is displayed in such a form that the route map is overlaid upon the map displayed on the display unit. Accordingly, in order to understand the set route (path), the driver must conduct an operation such as scrolling of the map to confirm the set route on the display picture of the display unit. Therefore, both time and ability of understanding are required.

Further, with respect to character information which cannot be displayed by the restriction of the display ability of the display section of the display unit, a method of displaying such character information in a form laid upon the map by special operation has been already proposed. In this case, it is necessary to erase a portion of the map displayed on the display section to display character information, or to display character information in a form overlaid upon a portion of the map. For this reason, there has been invited the problem that a portion of the map might fail to be displayed at the display section.

This invention has been proposed in view of the above-described actual circumstances, and its object is to provide a map information display apparatus capable of displaying map information, and arbitrarily designating character information relating to the map display content, thus to output it by voice.

A further object of this invention is to provide a traveling route (path) display apparatus for a moving body such that when the user allows map information from a recording medium on which map information is recorded to be displayed on the screen, the driver of a moving body such as a vehicle, etc. is permitted to confirm the position of the moving body being traveled on the map by outputting the name of the concerned position by voice even if he visually confirms the picture displayed.

A still further object of this invention is to provide a route guidance apparatus for a moving body such that when the user allows map information from a recording medium on which map information is recorded to be displayed on the screen, the user is permitted to confirm the route up to the place of destination set by the user by outputting it by voice.

DISCLOSURE OF THE INVENTION

In order to solve the above-described problems and to attain the above-mentioned objects, a map information display apparatus according to this invention includes an output section, a display section, a position designating section, and a converting section. The output section outputs map information including character information corresponding to positions on the map. The display section displays map information delivered from the output section. The position designating section designates an arbitrary position on the map displayed on the display section. The converting section converts character information corresponding to the position on the map designated by the position designating section into voice to output it.

Moreover, this invention is directed to a map information display apparatus using a recording medium on which map information including character information corresponding to respective positions on the map and management information for carrying out management of the map information are recorded, wherein the apparatus includes a reproducing section, a display section, a position designating section, a converting section, and a control section. The reproducing section reproduces map information from the recording medium. The display section displays map information delivered from the reproducing section. The position designating section designates an arbitrary position on the map displayed on the display section. The converting section converts character information recorded on the recording medium in correspondence with the position on the map designated by the position designating section into voice to output it. The control section is operative so that in the case where the recording medium is (judged to be) a recording medium on which map information including character information is recorded by an output signal from the reproducing section, it allows the converting section to convert character information corresponding to the position on the map designated by the position designating section into voice to output it.

Further, in order to solve the above-described problems and to attain the above-mentioned objects, a traveling route display apparatus for a moving body according to this invention includes a position detecting section, an output section, a display section and a converting section. The position detecting section detects the current position of the moving body. The output section outputs map information including character information corresponding to a position on the map recorded on the recording medium, etc. The display section displays map information delivered from the output section, and displays the current position of the moving body detected by the position detecting section. The converting section converts character information corresponding to the current position of the moving body detected by the position detecting section into voice to output it.

Further, this invention is directed to a traveling route display apparatus for a moving body using a recording medium on which map information including character information corresponding to respective positions on a map and management information for carrying out management of the map information are recorded, wherein the apparatus includes a position detecting section, a reproducing section, a display section, a converting section, and a control section. The position detecting section detects the current position of the moving body. The reproducing section reproduces map information from the recording medium. The display section displays map information delivered from the reproducing section, and displays the current position of the moving body detected by the position detecting section on the map information. The converting section converts character information corresponding to the position on the map designated by the position detecting section into voice to output it. The control section is operative so that in the case where the recording medium is (judged to be) a recording medium on which map information including character information is recorded by an output signal from the reproducing section, it allows the converting section to convert character information corresponding to a position on the map designated by the position detecting section into voice to output it.

In addition, in order to solve the above-described problems and to attain the above-mentioned objects, a route guidance apparatus for a moving body according to this invention includes an operation input section, a memory and a converting section. The operation input section is operated by the user. The memory stores data relating to a movement scheduled route (path) set by allowing the user to operate the operation input section. The converting section converts, on the basis of map information having character information corresponding to a position on the map and data relating to a movement scheduled route read out from the memory, character information of the map information at the position on the map along the movement scheduled route into voice to output it.

In accordance with this invention, an approach is employed to convert character information corresponding to a position on the map into voice on the basis of the designated position on the map or current position of the moving body, whereby user can recognize without observing the displayed map information, that map information by voice.

BRIEF DESCRIPTION OF THE INVENTION

A and B of FIG. 1 are explanatory views showing, in a model form, an example of data recorded in the data recording area of CD-ROM disc as a recording medium used in this invention.

BEST MODE FOR CARRYING OUT THE INVENTION

An embodiment of a navigation system which is one applied example of a map information display apparatus, a traveling route display apparatus for a moving body and a route guidance apparatus for a moving body according to this invention will now be described in detail with reference to the attached drawings. In the embodiment described below, explanation will be given by taking the example where a read only optical disc, e.g., CD-ROM disc is used as a recording medium on which map information is recorded, and explanation will be given by taking the example where an automotive vehicle is employed as a moving body.

Initially, the CD-ROM disc used in the embodiment of this invention will be described below. This CD-ROM disc includes a data recording area where map data and character data are recorded and a management information area where management data for reading out the map data and the character data recorded in the data recording area is recorded.

In the management information area, there is recorded discrimination data provided at the inner circumferential side of the data recording area of the CD-ROM disc and adapted for whether or not character data which will be described later is recorded. In the management information area, there are recorded various management data for reading out data recorded in the data recording area on the basis of the position data detected by the current position detecting unit which will be described later.

Figure 1:
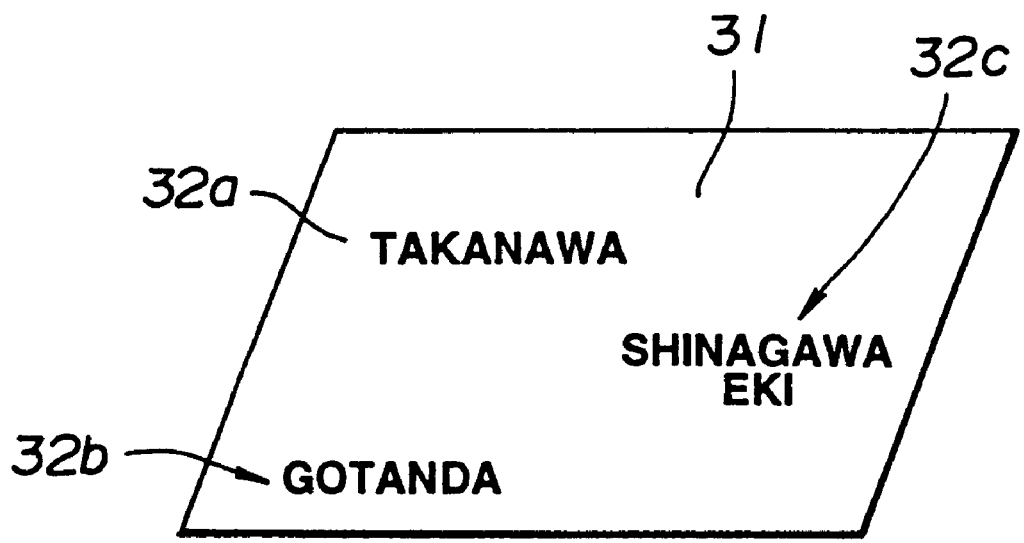
Figure 1:
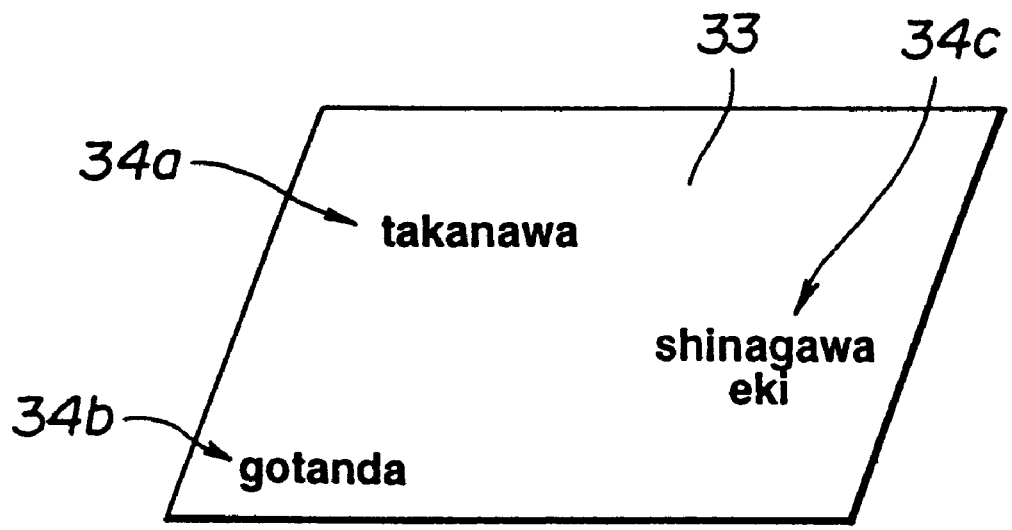

In the data recording area, a plurality of data necessary for displaying a map on a display unit and for outputting voice which will be described later are recorded in a hierarchical manner. As an example of the hierarchical (layered) structure of these plural data, a layer 31 of character data for display having data necessary for displaying characters on the display unit as indicated by A of FIG. 1, and a layer 33 of character data for voice output having character data for voice output which will be described later although not displayed on the display unit as indicated by B of FIG. 1 are provided. As indicated by A of FIG. 1, e.g., at the display character data layer 31 where map data for displaying, e.g., map on the display unit is recorded, display character data 32a of "TAKANAWA", display character data 32b of "GOTANDA" and display character data 32c of "SHINAGA EKI" (Shinagawa Station) are recorded and allocated. On the other hand, as indicated by B of FIG. 1, at the character data layer 33 for voice output, character data 34a for voice output of "takanawa", character data 34b for voice output of "gotanda" and character data 34c for voice output of "shinagawa eki" are recorded and allocated by the Shift JIS code. In this case, the display character data 32a, 32b, 32c and the voice output character data 34a, 34b, 34c are respectively recorded at the display character data layer 31 and the voice output character data layer 33 so that they have one-to-one correspondence relationship. In the data recording area, in addition to the display character data layer 31 and the voice output character data layer 33, a data layer where background data for displaying background on the display unit is recorded and a data layer where road data for displaying road is recorded, etc. are provided in a hierarchical manner, along with the character data layers 31, 33.

Figure 2:
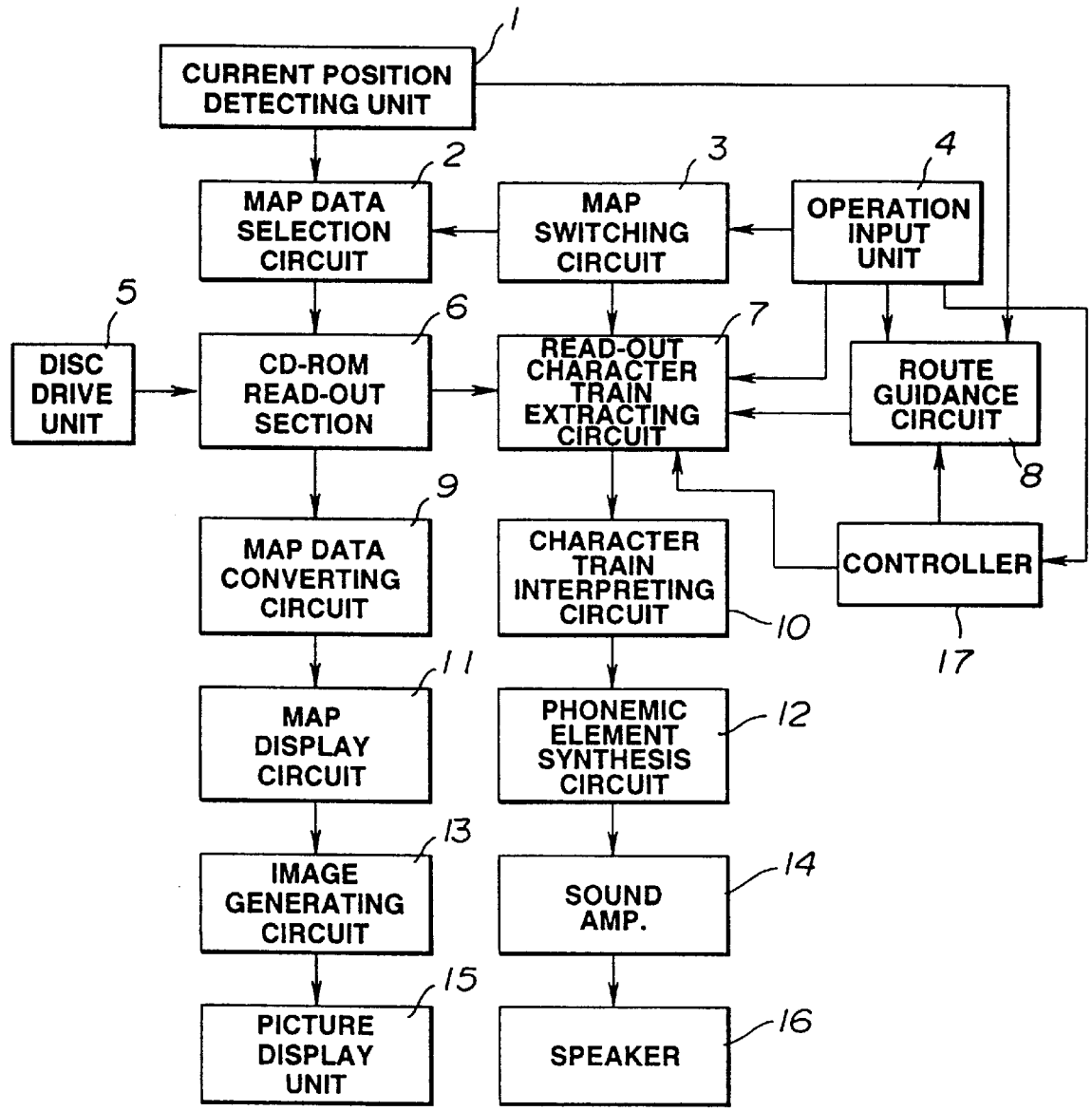
FIG. 2 is a block diagram showing the configuration of a navigation system according to an embodiment of this invention.

The navigation system according to the embodiment will now be described with reference to FIG. 2. The navigation system includes a current position detecting the unit 1 for detecting the current position of an automotive vehicle as a moving body. The current position detecting unit 1 includes a GPS (Global Positioning System) receiving section (not shown), and is operative to calculate current position, longitude, latitude and height of the vehicle on the basis of a signal received at the GPS receiving section to measure the current position of the vehicle. As the current position detecting unit 1, there may be used a device such that a relative position is determined by calculation in accordance with the movement direction and distance thereof by using a vehicle speed sensor and piezoelectric gyro (gyroscope) without employment of a measurement method using the GPS as described above. Measurement position data of the vehicle determined by the current position detecting unit 1 is delivered to a map data selection circuit 2 and a route guidance circuit 8.

The map data selection circuit 2 generates map select data indicating display range of map data from the CD-ROM disc on the basis of measurement position data delivered from the current position detecting unit 1 and map switching data delivered from map switching circuit 3 which will be described later. The map select data thus generated is delivered to a CD-ROM read-out section 6.

The map switching circuit 3 generates map switching data which provides map select data on the basis of information inputted from an operation input unit 4 to deliver the map switching data thus generated to the map data selection circuit 2, and to deliver it to a read-out character train extracting circuit 7.

The operation input unit 4 is comprised of a key or joy stick which can carry out movement operation of the cursor displayed within the picture on the screen of the display unit 15 which will be described later. Data inputted as the result of the fact that the operation input section 4 is operated is delivered to the map switching circuit 3 and the read-out character train extracting circuit 7.

The above-described CD-ROM disc is loaded into a disc drive unit 5. The disc drive unit 5 includes an optical head (not shown) for reading out data from the loaded CD-ROM disc, and a signal processing section (not shown) for implementing signal processing to a signal outputted from the optical head to output a reproduction signal.

The reproduction signal from the disc drive unit 5 is delivered to the CD-ROM read-out section 6. The CD-ROM read-out section 6 discriminates, on the basis of discrimination data of the management information area of the CD-ROM disc among reproduction signals delivered from the disc drive unit 5, whether or not the CD-ROM disc loaded into the disc drive unit 5 is a CD-ROM disc having character data layer 33 for voice output. In the case where the CD-ROM disc loaded into the disc drive unit 5 is the CD-ROM disc having character data layer 33 for voice output, character data for voice output is delivered from the CD-ROM read-out section 6 to the read-out character train extracting circuit 7. The CD-ROM read-out section 6 selects, on the basis of map data select data delivered from the map data selection circuit 2, map data including a current position based on measurement position data of the vehicle from the current position detecting unit 1 or position designated by the operation input unit 4 from map data as reproduction signals outputted from the disc drive unit 5 to deliver the selected map data to a map data converting circuit 9.

A route guidance circuit 8 includes memory (not shown) for storing data relating to the movement scheduled route that the user sets by using the operation input unit 4. The route guidance circuit 8 generates route explanation data on the basis of measurement position data of the vehicle delivered from the current position detecting unit 1 and data relating to movement scheduled route stored in the memory. The route guidance circuit 8 delivers the generated route explanation data to the read-out character train extracting circuit 7.

The map data converting circuit 9 converts map data delivered from the CD-ROM read-out section 6 into map display data to deliver the converted map display data to a map display circuit 11. The map display circuit 11 implements signal processing to the map display data delivered from the map data converting circuit 9 to generate image information to deliver the generated image information to an image generating circuit 13. The image generating circuit 13 implements signal processing to the image information delivered from the map display circuit 11 to generate a video signal to deliver it to a display unit 15. The display unit 15 is comprised of a liquid crystal display element or a cathode ray tube, etc., and serves to display an image based on the video signal.

The read-out character train extracting circuit 7 will now be described. The read-out character train extracting circuit 7 extracts character data for voice output from data delivered from the CD-ROM read-out section 6. Moreover, the read-out character train extracting circuit 7 sets the place name read-out mode, the own vehicle (position) read-out mode and route explanation mode on the basis of a control signal from controller 17 which will be described later outputted on the basis of input from the operation input unit 4.

When the place name read-out mode is set, the read-out character train extracting circuit 7 outputs character code for outputting voice corresponding to the position designated by allowing the user to move a cursor on the display picture of the display unit 15 by using the operation input unit 4. For example, an approach is employed to extract, as character data for voice output, an name of an address to which the position on the display picture of the display unit 15 designated by the user by using operation input unit 4 belongs from a group of names of a addresses, or the name of point of the place nearest to the designated position from a group of names of objects (places of destination) particularly in the case where the designated position is a name relating to facilities such as station, school, hospital or garden, etc. to cover the extracted character data for voice output into character code of hiragana to deliver it to a character train interpreting (decoding) circuit 10.

When the own vehicle read-out mode is set, the read-out character train extracting circuit 7 outputs a character code for outputting voice corresponding to a current position detected by the current position detecting unit 1. For example, the extracting circuit 7 extracts, as character data for voice output, on the basis of measurement position data from the current position detecting unit 1, the name of addresses to which the point of place designated belongs on the basis of measurement data similarly to that in the place name read-out mode from the groups of addresses, or the name of point or place nearest to the designated position from the group of names of objects (places of destination) particularly in the case where the designated position is a name relating to facilities such as station, school, hospital or garden, etc. to convert the extracted character data for voice output into character code of hiragana to deliver it to the character train interpreting circuit 10. When the point or place designated by measurement position data from the current position detecting unit 1 is the cross-point or object on the road, character data for voice output relating to the road name or cross-point name corresponding to the point of the place designated by the measurement position data is extracted from the group of road names or the group of cross-point names. The extracted character data for voice output relating to the road name or cross-point name is converted into character code of hiragana similarly to the above. The character code thus obtained is delivered to the character train interpreting circuit 10.

When the route explanation mode is set, character code for outputting, by voice, route explanation information corresponding to the movement route is outputted on the basis of data relating to the movement scheduled route from the route guidance circuit 8. For example, the read-out character train extracting circuit 7 extracts, as character data for voice output, the name of the road, or the name of the cross-point, etc. from the group of road names or the group of cross-points in accordance with the movement scheduled route on the basis of map switching data delivered from the map switching circuit 3 and route read-out data generated on the basis of data relating to the movement scheduled route delivered from the route guidance circuit 8, i.e., on the basis of data relating to movement scheduled route set and stored at the route guidance circuit 8 to convert the extracted character data for voice output into character code of hiragana to deliver it to the character train interpreting circuit 10. At this time, with respect to character code delivered to the character train interpreting circuit 10, when either one of the place name read-out mode and the own vehicle (position) read-out mode is set, the character code for reading out the name of place is outputted, while when the route explanation mode is set, a character train like description (explanation) in a short sentence form prepared so that the movement scheduled route is easy to be understood for the user in such a manner that "please turn at the cross-point A to the left to advance on the road B in the direction of west by 2 kilometers to turn at the cross-point C to the right" is outputted.

The character train interpreting circuit 10 implements decode processing to character code delivered from the read-out character train extracting circuit 7 to convert it into phonemic elements. The converted phonemic elements are delivered to a phonemic element synthesis circuit 12. The phonemic element synthesis circuit 12 is composed of a synthesis circuit and/or a digital signal processing circuit constituted with IC, etc., and serves to synthesize phonemic elements delivered from the character train interpreting circuit 10 to generate a signal indicating voice of the place name, road name, cross-point name or station name, etc. to deliver it to a sound (acoustic) amplifying circuit 14. The sound amplifying circuit 14 amplifies the signal delivered from the phonemic element synthesis circuit 12. An output signal from the sound amplifying circuit 14 is delivered to a speaker 16. The output signal thus obtained is subjected to electro-acoustic conversion by the speaker 16. The signal thus obtained is outputted as voice.

A controller 17 is comprised of microcomputer, and serves to carry out control of the operation of the entirety of the system on the basis of control of ON/OFF operation of the entirety of the system or input from the operation input unit 4, and to control the operations of the above-described respective components. Further, the controller 17 generates a control signal on the basis of input from the operation input unit 4. By this control signal, any one of the place name read-out mode, the own vehicle read-out mode and the route explanation mode is set at the read-out character train extracting circuit 7.

Figure 3:
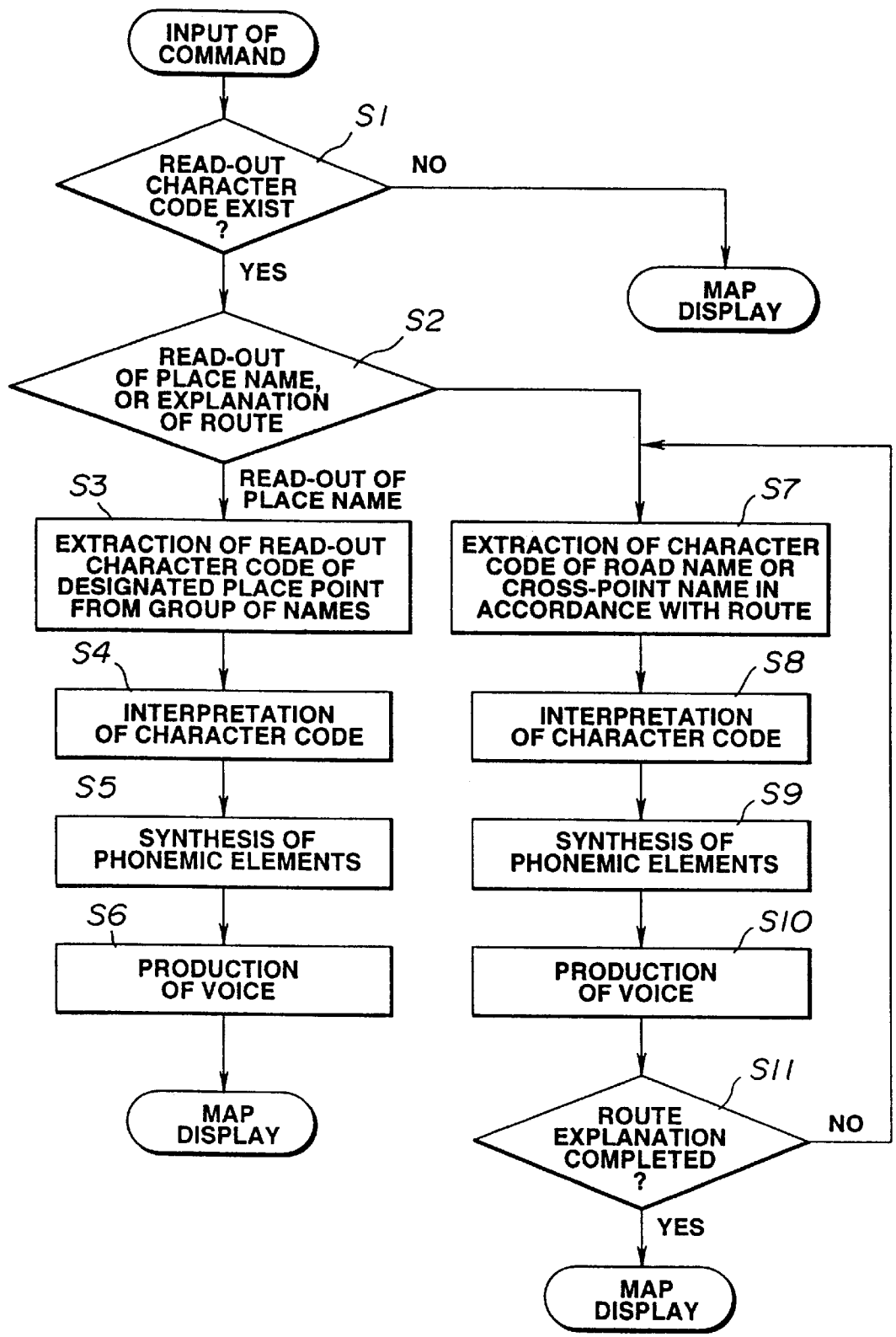
FIG. 3 is a flowchart for explaining the operation of the navigation system.

The operation of the navigation system will now be described with reference to the flowchart shown in FIG. 3. It is to be noted that the program for operation control shown in the flowchart of FIG. 3 is stored in the memory within the controller 17.

Initially, when the operation input unit 4 is operated by the user so that start of the map display operation is inputted, by the disc drive unit 5 is started (operated). When the disc drive unit 5 is started, discrimination data of the CD-ROM disc loaded in the disc drive unit 5 is discriminated at step S1. As a result, when it is discriminated that character data for voice output is not recorded on the loaded CD-ROM disc, an operation to display, on the display unit 15, only the map based on map data recorded on the CD-ROM disc is carried out. On the other hand, when it is discriminated at the step Si that character data for voice output is recorded on the loaded CD-ROM disc, map based on map data is displayed on the display unit 15. Thus, the processing operation proceeds to step S2. In order to display the map on the display unit 15, there are instances where output from the current position detecting unit 1 is used and instances where input from the operation input unit 4 is used. Namely, in the case where output from the current position detecting unit 1 is used, map data corresponding to measurement position data from the current position detecting unit 1 is accessed on the basis of management data of the CD-ROM disc to read out it from the CD-ROM disc. Thus, a map is displayed on the display unit 15. Moreover, in the case where input from the operation input unit 4 is used, map serving as select menu information or initial data recorded in the management information area of the CD-ROM disc is once displayed on the display unit 15 to select a predetermined map information by the displayed select menu information by using the operation input unit 4. Thus, map based on map data which has been read out on the basis of select data and management data of the CD-ROM disc is displayed on the display unit 15. In addition, access data relating to a map that the user desires may be inputted from the operation input unit 4 to provide an access to map data recorded in the data recording area on the basis of management data of the CD-ROM disc in accordance with the inputted access data to read out the map data, thus to display, on the display unit 15, a map based on the map data which has been read out.

At the step S2, whether the mode set by the operation input unit 4 is any one of the place name read-out mode, the own vehicle read-out mode and the route explanation mode is discriminated. When it is discriminated at the step S2 that the set mode is any one of the place name read-out mode and the own vehicle read-out mode, the processing operation proceeds to step S3. Moreover, when the set mode is the route explanation mode, the processing operation proceeds to step S7. At the step S3, character data for voice output corresponding to a point of place designated by input from the operation input unit 4, or a point of place designated on the basis of measurement position data from the current position detecting unit 1 is extracted from output data from the CD-ROM read-out section 6 at the read-out character train extracting circuit 7. Further, the extracted character data for voice output is converted into character code of hiragana used for voice output. The character code thus obtained is outputted. At step S4, character code outputted from the read-out character train extracting circuit 7 is subjected to decode processing and is converted into phonemic elements at the character train interpreting circuit 10. At step S5, phonemic elements outputted from the character train interpreting circuit 10 are synthesized at the phonemic element synthesis circuit 12. Further, the synthetic signal thus obtained is amplified at the sound amplifying circuit 14. When the processing of the step S5 is completed, the processing operation proceeds to step S6. At the step S6, a point of place designated by input from the operation input unit 4 or name, etc. corresponding to a point of place designated on the basis of measurement position data from the current position detecting unit 1 on the map displayed on the display unit 15 is outputted by voice from the speaker 16. The driver of the automotive vehicle, i.e., the user can confirm current position or designated position on the map without necessarily confirming, directly by visual observation, the display of the display unit 15. Thus, the user can concentrate his attention on driving.

On the other hand, when the route explanation mode is set at the read-out character train extracting circuit 7, the processing operation proceeds to step S7 as described above. At the step S7, character data for voice output corresponding to the traveling scheduled route (path) is extracted from an output signal from the CD-ROM read-out section 6 at the read-out character train extracting circuit 7 on the basis of data relating to the traveling scheduled route set and stored at the route guidance circuit 8. Further, the extracted character data for voice output is converted into character code of hiragana used for voice output. The character code thus obtained is outputted. At step S8, the character code outputted from the read-out character train extracting circuit 7 is subjected to decode processing and is converted into phonemic elements at the character train interpreting circuit 10. At step S9, phonemic elements outputted from the character train interpreting circuit 10 are synthesized at the phonemic element synthesis circuit 12. The synthetic signal thus obtained is further amplified at the sound amplifier circuit 14. When the processing of the step S9 is completed, the processing operation proceeds to step S10. At the step S10, explanation relating to the movement scheduled route is outputted as voice from the speaker 16 on the basis of data relating to the movement scheduled route set by the user. The voice outputted from the speaker 16 is continued until the explanation relating to the movement scheduled route is completed. In the route explanation mode, the user is informed, by voice, of information relating to the set movement scheduled route or point of place in the vicinity of the movement scheduled route. At this time, since the movement scheduled route is outputted by voice, the user is only required to confirm map information of the display unit 15 as occasion demands. It is to be noted that it is not necessarily required to display map information on the display unit 15. As a result, it is unnecessary to confirm in succession map information displayed on the display unit 15 in correspondence with the movement scheduled route outputted by voice. Accordingly, user can concentrate his attention on driving of the automotive vehicle. In addition, the map may be displayed by scrolling on the display unit 15 in correspondence with the movement scheduled route outputted by voice at the time of route explanation mode so that the user can confirm, by voice, movement scheduled route set by voice while displaying map information on the display unit 15.

Figure 4:
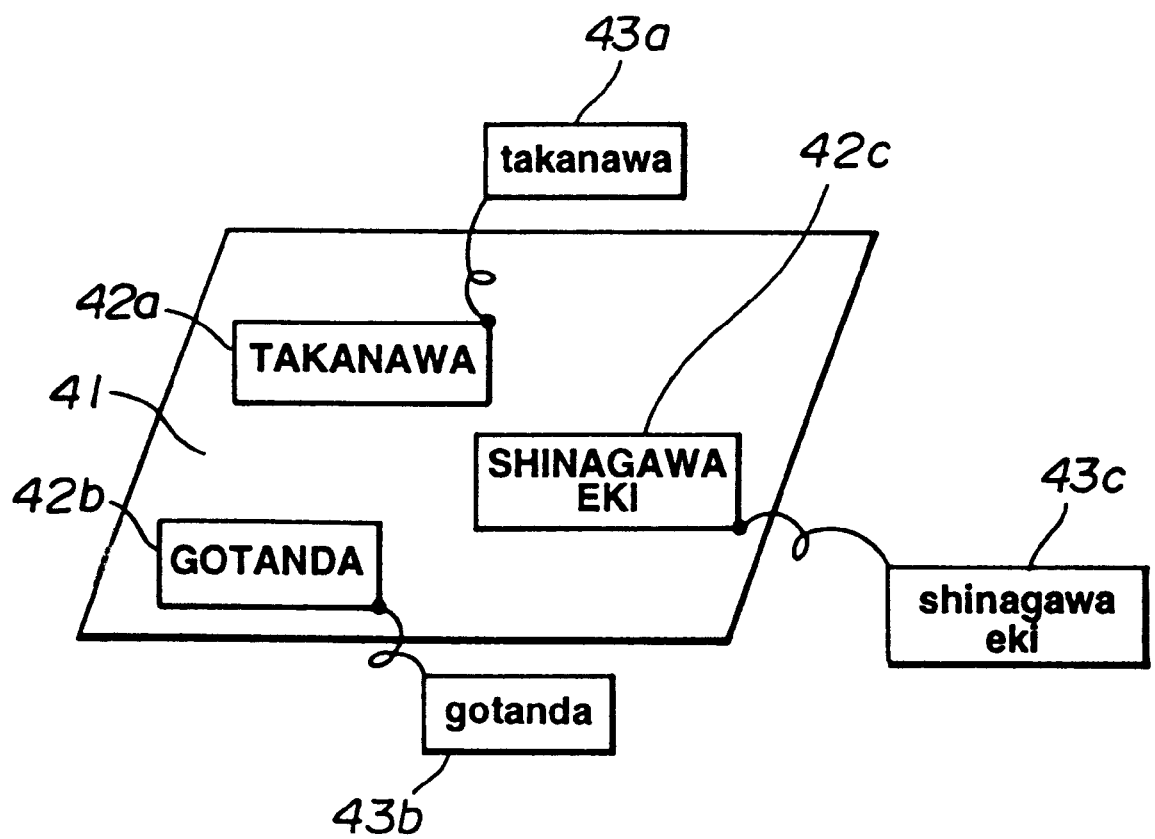
FIG. 4 is a view showing, in a model form, another example of data recorded in the data recording area of CD-ROM disc.

Another example of map data and character data for voice output recorded in a hierarchical manner on the CD-ROM disc is shown, in a model form, in FIG. 4. At a layer 41 of character data for display, similarly to A of FIG. 1, character data 42a for display of "TAKANAWA", character data 42b for display of "GOTANDA" and character data 42c for display of "SHINAGAWA EKI" are recorded and allocated. In association with these character data 42a, 42b, 42c for display, character data 43a of "takanawa", character data 43b of "gotanda" and character data 43c of "shinagawa eki" are provided. These character data for voice output are recorded by the Shift JIS code. In addition, such character data for voice output are extracted by the read-out character train extracting circuit 7 in a manner similar to the above, and are converted into character codes of hiragana used for output of voice.

This invention may be modified in various manners within a range which does not depart from the scope of this invention to without being limited to the above-described embodiment.

While, in the above-described embodiment, explanation has been given by taking the example where character data for voice output and character data for display are recorded in a hierarchical manner on the CD-ROM disc as a recording medium, character data for display may be delivered to the read-out character train extracting circuit 7 to convert it into character code of hiragana by the read-out character train extracting circuit 7. Moreover, character information may be recorded by kanji or Alphabet, etc. at character data layer for voice output of the CD-ROM disc to provide, at the read-out character train extracting circuit 7, a memory in which directory data is stored, and to allow it to have directory function to convert these character data outputted from the CD-ROM read-out section 6 into hiragana character code by the memory and the directory function of the read-out character train extracting circuit 7. As character data for voice output recorded on the CD-ROM disc, character code or code such as phonetic symbol, etc. may be used in addition to the Shift JIS code.

Further, with respect to character data for voice output recorded on the recording medium, in addition to character information displayed on the map, such information which do not appear on the map displayed on the display unit may be recorded at the character data layer for voice output of the recording medium.

While this invention has been described by taking the example where it is applied to the navigation system, this invention is not limited to the navigation system, but may be also applied to portable information terminals or small electronic equipments having a function of reproducing a recording medium on which map information is recorded, e.g., a portable CD-ROM reproducing unit.

What is claimed is:

1. A map information display apparatus comprising:

a CD-ROM disc including a recording area for storing map information, character information, and voice information in a hierarchical manner, wherein the map, character, and voice information are each stored at separate hierarchical levels therein, and further including a management information area located on an inner annular area of the recording area having recorded therein discrimination data for discriminating whether the voice information is recorded in the recording area;

CD-ROM read-out means for determining whether the CD-ROM disc has the voice information recorded therein based on the discrimination data recorded in the management information area;

output means for outputting only the map information and the character information corresponding to respective positions on a map when the CD-ROM read-out means determines that the voice information is not recorded in the CD-ROM disc;

display means for displaying the map information and the character information output from the output means;

position designating means including a joystick operable by a user for moving a cursor for designating an arbitrary position on the map displayed on the display means and for selecting a reporting mode; and converting means for converting the voice information corresponding to the arbitrary position on the map and to a selected reporting mode designated by the position designating means into a voice output signal when the CD-ROM read-out means determines that the voice information is recorded in the CD-ROM disc.

2. The map information display apparatus as set forth in claim 1, wherein the converting means includes voice synthesis means for carrying out voice synthesis on the voice information corresponding to the arbitrary position on the map and the selected reporting mode designated by the position designating means.

3. The map information display apparatus as set forth in claim 2, wherein the converting means includes voice output means for outputting voice synthesized by the voice synthesis means.

4. A traveling route display apparatus for a moving body, comprising:

position detecting means for detecting a current position of the moving body;

a CD-ROM disc including a recording area for storing map information, character information, and voice information organized in a hierarchical manner corresponding to positions on a map, wherein the character and the voice information are stored at separate hierarchical levels, and further including a management information area located on an inner annular area of the recording area having recorded therein discrimination data for discriminating whether the voice information is recorded in the recording area;

CD-ROM read-out means for determining whether the CD-ROM disc has the voice information recorded therein based on the discrimination data recorded in the management information area;

user input means including a joystick operable by a user for moving a cursor for designating a reporting mode;

output means for outputting only the map information and the character information corresponding to the current position of the moving body on the map when the CD-ROM read-out means determines that the voice information is not recorded in the CD-ROM disc;

display means for displaying the map information and the character information output from the output means, and for displaying the current position of the moving body detected by the position detecting means; and converting means for converting the voice information corresponding to the reporting mode and to the current position of the moving body detected by the position detecting means into a voice output when the CD-ROM read-out means determines that the voice information is recorded in the CD-ROM disc.

5. The traveling route display apparatus for a moving body as set forth in claim 4, wherein the reporting mode includes a route explanation mode where information corresponding to a description of landmarks in a vicinity of a route set by the user input means is output by the output means and the converting means.

6. The traveling route display apparatus for a moving body as set forth in claim 4, wherein the reporting mode includes a vehicle position mode where information corresponding to an absolute position on the map detected by the position detecting means is output by the output means and the converting means.

7. The traveling route display apparatus for a moving body as set forth in claim 4, wherein the converting means includes:

voice synthesis means for carrying out voice synthesis on the voice information corresponding to the position on the map detected by the position detecting means; and voice output means for outputting voice synthesized by the voice synthesis means.

8. The traveling route display apparatus for a moving body as set forth in claim 4, further comprising setting means for setting a route through which the moving body travels using the user input means, wherein the converting means outputs the voice output as route information corresponding to positions in a vicinity of a route set by the setting means.

9. The apparatus according to claim 4, wherein the reporting mode includes a place-name readout mode where voice information corresponding to a place name corresponding to the current position is output by the converting means.

* * * * *